(12) United States Patent
Nathan

(10) Patent No.: US 6,630,896 B1
(45) Date of Patent: Oct. 7, 2003

(54) SYSTEM AND METHOD FOR PREVENTING DETECTION OF TOUCH SCREEN INPUT DATA

(75) Inventor: Robert H. Nathan, Atlanta, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/573,428

(22) Filed: May 16, 2000

(51) Int. Cl.[7] .............................................. H03M 11/00
(52) U.S. Cl. ..................... 341/34; 178/19.04; 178/18.01
(58) Field of Search .............................. 341/34, 33, 26, 341/5; 178/18.01, 19.04, 18.06, 18.05; 345/173, 174, 179; 340/5.21

(56) References Cited

U.S. PATENT DOCUMENTS

| | | | | |
|---|---|---|---|---|
| 5,025,255 A | * | 6/1991 | Mould | 341/22 |
| 5,387,765 A | * | 2/1995 | Crooks | 178/18.05 |
| 5,818,430 A | * | 10/1998 | Heiser | 178/18.05 |
| 5,861,875 A | * | 1/1999 | Gerpheide | 178/18.06 |
| 5,956,020 A | * | 9/1999 | D'Amico et al. | 345/173 |
| 6,061,051 A | * | 5/2000 | Chan et al. | 345/173 |
| 6,236,386 B1 | * | 5/2001 | Watanabe | 345/100 |
| 6,411,284 B1 | * | 6/2002 | Junghans | 345/173 |

* cited by examiner

Primary Examiner—Michael Horabik
Assistant Examiner—Hung Dang
(74) Attorney, Agent, or Firm—Maginot, Moore & Bowman LLP

(57) ABSTRACT

A system and method obfuscates a reference voltage being applied to a touch screen to reduce the likelihood that location coordinates may be obtained from electrically coupling to the touch screen. The method is performed by applying a varying reference voltage to a first plane of a touch screen with a time of application duration being substantially less than a touch period and by measuring a voltage present on a second plane during a portion of the application duration of the voltage to the first plane. A system may include a controller for randomly varying the reference voltage level and coupling a reference source that generates the reference voltage to a first plane of a touch screen for an application period that is significantly less than the touch period.

13 Claims, 2 Drawing Sheets

US 6,630,896 B1

SYSTEM AND METHOD FOR PREVENTING DETECTION OF TOUCH SCREEN INPUT DATA

FIELD OF THE INVENTION

This invention relates generally to electronic touch screens and, more particularly, to methods and systems for securing data entered through a touch screen.

BACKGROUND OF THE INVENTION

Electronic touch screens that provide coordinate data regarding the location of an object being brought into proximity to a screen are well known. Typically, keypads are displayed on touch screens to receive user input for application programs. These keypads are comprised of a plurality of keys that are displayed on a screen. Each keypad typically is defined by two or more corner coordinates and/or length and width parameters. These keypad data define areas on the screen that correspond to particular keys. In response to an object being brought into proximity to the screen, the screen generates location coordinates for the 'touch' and a screen control program determines whether the coordinates of the 'touch' correspond to one of the defined keypad areas. If they do, the screen control program retrieves input data that correspond to the keypad area that was 'touched' and this input data are provided to an application program. Otherwise, no input data are recognized as being generated from the touch screen and exception processing may occur to indicate an erroneous touch to the user.

Typically, a touch screen generates coordinates for a location where an object is brought into proximity to the screen. The screen may be a resistive touch screen that is comprised of two planes of resistive material that are electrically insulated from one another and generally parallel to one another. To detect the location of a touch to the screen, a reference voltage is applied to one of the planes. This plane is called the 'active' plane. A location signal for a touch occurs when the force of the touch causes an electrical contact between the two planes and the voltage present at the other plane is measured. With linear resistance in the active plane, the location of the point of contact is directly proportional to the distance the contact point lies from the voltage source. This location gives the proportionate distance along the axis of the active plane. The voltage is then removed from the active plane and applied to the other plane. This action reverses the roles of the two planes so voltage measurement of the other plane provides a proportionate distance along the other axis.

Such touch screens may be used in applications where the data entered through the screen requires security. For example, a touch screen keypad may be used for the entry of alphanumeric data that are interrogated for determining whether access to a room or a financial account is allowed. One way an intruder may endeavor to obtain this data to gain unauthorized access to a location or account is to surreptitiously observe the entry of the data so the intruder may later use it. However, the authorized person may be cautious enough to detect any such effort to observe the data entry.

To avoid being noticed by an authorized person entering data, the intruder may couple a voltage measurement device to the touch screen planes and record the voltage changes on the planes. By observing the reference voltages and the changes in the reference voltages on the planes, the intruder may determine the locations of touches that an authorized user applied to the screen. The intruder may then be able to coordinate the touch locations with keys on the screen to determine the alphanumeric key sequence for access to a location or account.

What is needed is a method for frustrating an intruder's ability to detect the locations of touches on a touch screen from voltages measured on the planes of the touch screen.

SUMMARY OF THE INVENTION

The above-noted limitations of previously known touch screens have been overcome by a system and method made in accordance with the principles of the present invention. The method of the present invention is comprised of applying a varying reference voltage to a first plane of a touch screen with a time of application duration being substantially less than a touch period and measuring a voltage present on a second plane during a portion of the application duration of the voltage to the first plane.

Observation of the voltage on the active plane provides a series of voltage measurements that vary in magnitude and that remain present only for the length of the application period. Because the first or active plane is coupled to the second plane for a time period that corresponds to the touch period and because the touch period is longer than the application period, the voltage present on the second plane during the application period probably remains at only one level. That level is the reference voltage applied during the application period multiplied by the ratio of the resistance of the active plane at the point of contact to the total resistance of the active plane along its axis. That is, the intruder may not measure a voltage transition from the reference voltage to the voltage indicative of the touch location because the load coupled by the touch to the reference voltage is present from the beginning to the end of the application period. Because the reference voltage is randomly varied, observation of voltages present on the first plane does not identify a constant reference voltage or a predictable pattern of reference voltages. In previously known methods where the reference voltage remained constant or varied in an observable pattern, the reference voltage could be determined. With that information and knowledge of the voltage on the second plane, which is the voltage corresponding to the touch, the distance of the touch from the voltage source could be determined. Thus, the method of the present invention frustrates an intruder's ability to determine the location of a touch by measuring the voltage on the second plane because the intruder is unable to accurately determine the reference voltage.

In a system implementing the principles of the present invention, a randomly varying reference source is coupled to a first plane of a touch screen for an application period that is significantly less than the touch period. A voltage measurement device is coupled to a second plane of the touch screen to measure the voltage present on the second plane when a touch occurs that couples the first plane to the second plane. The ratio of the measured voltage to the reference voltage may be used to determine the location coordinate of a touch along the axis of the first plane. The controller then applies a reference voltage to the second plane and the measurement device measures the voltage present on the first plane. The ratio computed from these two voltages may then be used to determine the location coordinate along the axis of the second plane. The location coordinates for these two operations define the location of the touch. In another type of system known as a 'five-wire' system, the voltage potential is still applied to the first plane but in a direction that is orthogonal to the application of the voltage for determination of the first location coordinate. Again, measurement of the voltage on the second plane at the touch point is used to compute the second location coordinate for the touch point.

The system and method of the present invention apply a randomly varying voltage to a first plane of a touch screen during application periods that are significantly smaller than the time that a touch is applied to the touch screen. The random variation of the reference voltage frustrates an intruder from determining the reference voltage and the short application period substantially reduces the likelihood that a transition occurs during a touch. By reducing the likelihood of a transition, an intruder is probably unable to determine the reference voltage and the measured voltage during measurement of a voltage caused by a touch.

These and other advantages and features of the present invention may be discerned from reviewing the accompanying drawings and the detailed description of the invention.

BRIEF DESCRIPTION OF THE DRAWINGS

The present invention may take form in various components and arrangement of components and in various steps and arrangement of steps. The drawings are only for purposes of illustrating an exemplary embodiment and are not to be construed as limiting the invention.

DETAILED DESCRIPTION OF THE INVENTION

Figure 1:
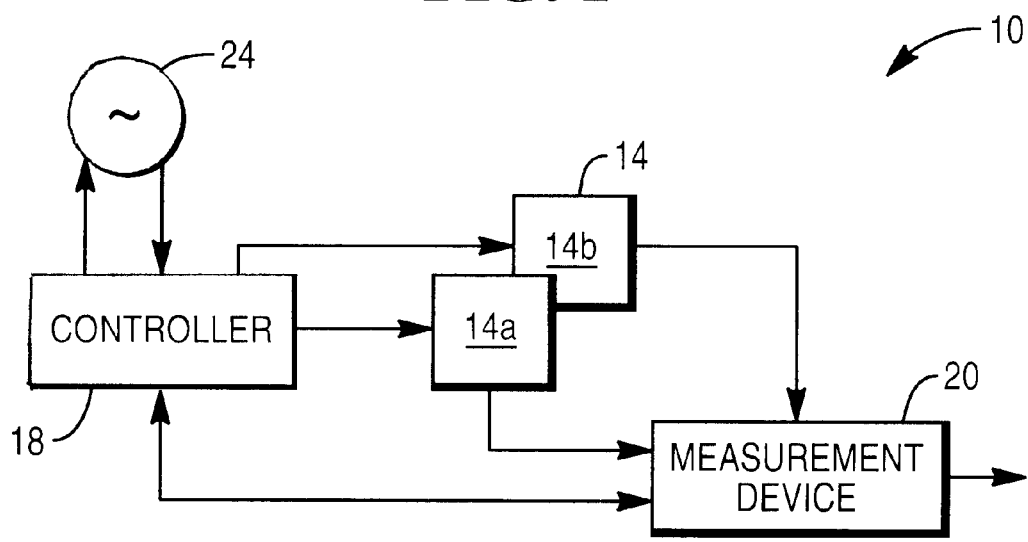
FIG. 1 depicts a block diagram of a system in which the method of the present invention may be implemented.

A system 10 in which the method of the present invention is implemented is shown in FIG. 1. System 10 includes a touch screen 14 that is comprised of two resistive planes 14a and 14b that are coupled to a reference voltage controller 18 and a voltage measurement device 20. Reference voltage controller 18 is coupled to a reference voltage source 24 to provide level control signals to voltage source 24 and the output of voltage source 24 is coupled to switching circuitry in controller 18. Switching circuitry in controller 18 couples one of touch screen planes 14a and 14b to source 24 for a time period corresponding to an application time period. When a reference voltage is coupled to a touch screen plane that plane may be called the 'active' plane. The other plane may be called the 'sensing' plane. Voltage measurement device 20 measures a voltage present on the sensing plane when no touch is being applied to the active touch screen plane. Measurement device 20 is coupled to voltage controller 18 to receive signals indicating the plane to which the reference voltage is being applied so measurements may be taken of the sensing plane. These signals include data regarding the reference voltage level being applied during an application period. Measurement device 20 uses these signals and measured voltage data to determine a voltage ratio indicative of a location coordinate corresponding to the axis of the active touch plane. As explained above, the roles of the touch planes may then be reversed so a location coordinate for the touch may be determined along the axis of the plane and the location coordinates provided to an application program for processing. Touch screen 14 may be any known touch screen that uses a similar method to generate coordinates for a location where an object is brought into proximity to screen 14. For example, the system and method of the present invention may be used with touch sensing screens such as capacitance screens, matrix arrangement screens, or the like.

Controller 18 performs two functions in accordance to the principles of the present invention. One function is to control the voltage level of the reference voltage that is applied to one of the touch screen planes 14a and 14b. The voltage level is preferably determined using a random process. Many methods for generating random numbers are well-known and may be used in the present invention. The random numbers may be mapped to the operating range of voltage source 24. Controller 18 also controls switching circuitry that couples source 24 to one of the touch screen planes 14a and 14b. In controlling the switching circuitry, controller 18 determines which plane is coupled to source 24, the time of reference voltage application and the duration of the voltage application. The reference voltage is preferably applied to a touch screen plane no more frequently than once during a touch period. The touch period is a period of time that corresponds to the shortest amount of time that a person may apply touch that generates a voltage on the sensing plane. The duration time is preferably substantially less in length than the touch period to reduce the likelihood that a transition occurs during application of a reference voltage to a touch screen plane. If a touch is initiated while a reference voltage is being applied to a touch screen plane, an intruder measuring voltages on the two planes may be able to measure the reference voltage present on the active plane before the touch is commenced and the voltage at the second plane after the touch has coupled the two planes to one another. If the application period is sufficiently short, the likelihood that all of the touches required for entry of an alphanumeric sequence corresponding to a security code may be determined by an intruder are remote. Preferably, the reference voltage is only applied once during an application period.

Figure 2:
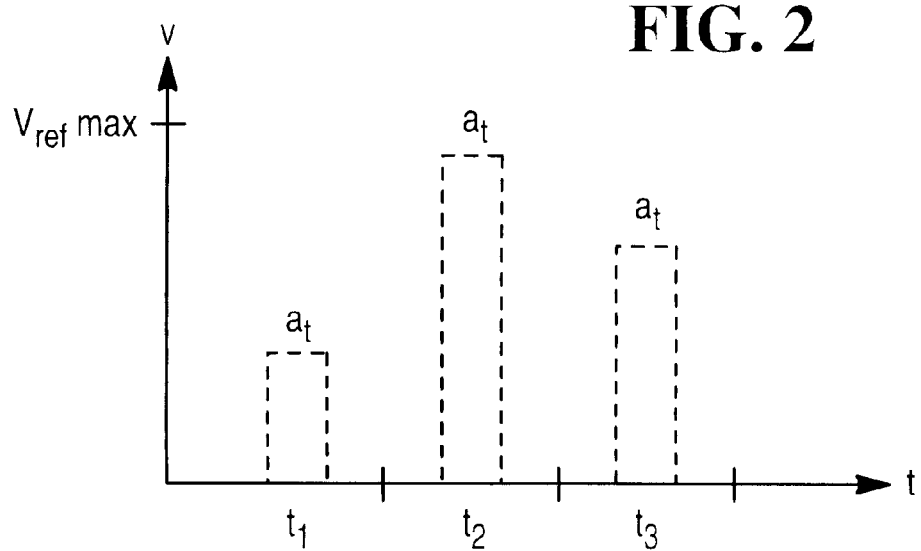
FIG. 2 is a graph displaying an exemplary group of reference voltages applied to one plane by the reference voltage controller shown in FIG. 1.

A diagram depicting reference voltages applied to an active plane is shown in FIG. 2. As can be seen, the voltages are applied approximately once during a touch period t for a period of time $a_r$. The voltages randomly vary in magnitude. As long as no touch couples the two planes together, no voltage is sensed on the sensing plane. However, when a voltage is detected on the sensing plane, a touch is occurring. Provided the touch does not occur during the presence of a reference voltage, the reference voltage and the voltage occurring as a result of the touch may not both be detected. Without both levels, the location of the touch cannot be located. In the present invention, the reference level is provided to voltage measurement device 20. This information allows voltage measurement device 20 to compute the ratio of the two voltages and determine the location of the touch along the axis of the active plane. A signal may be returned to controller 18 that indicates a voltage was sensed on the sensing plane so controller 18 may de-couple the active plane from source 24 and begin applying reference voltages to the other plane to reverse the function of the active and sensing planes. Voltage measurement device 20 may then determine the location of the touch along the axis of the other plane. In a 'five-wire' system, the first active plane remains the active plane but the voltage source is coupled to the plane so that the voltage potential produces current in a direction that is orthogonal to the current used for determining the first location coordinate.

Figure 3:
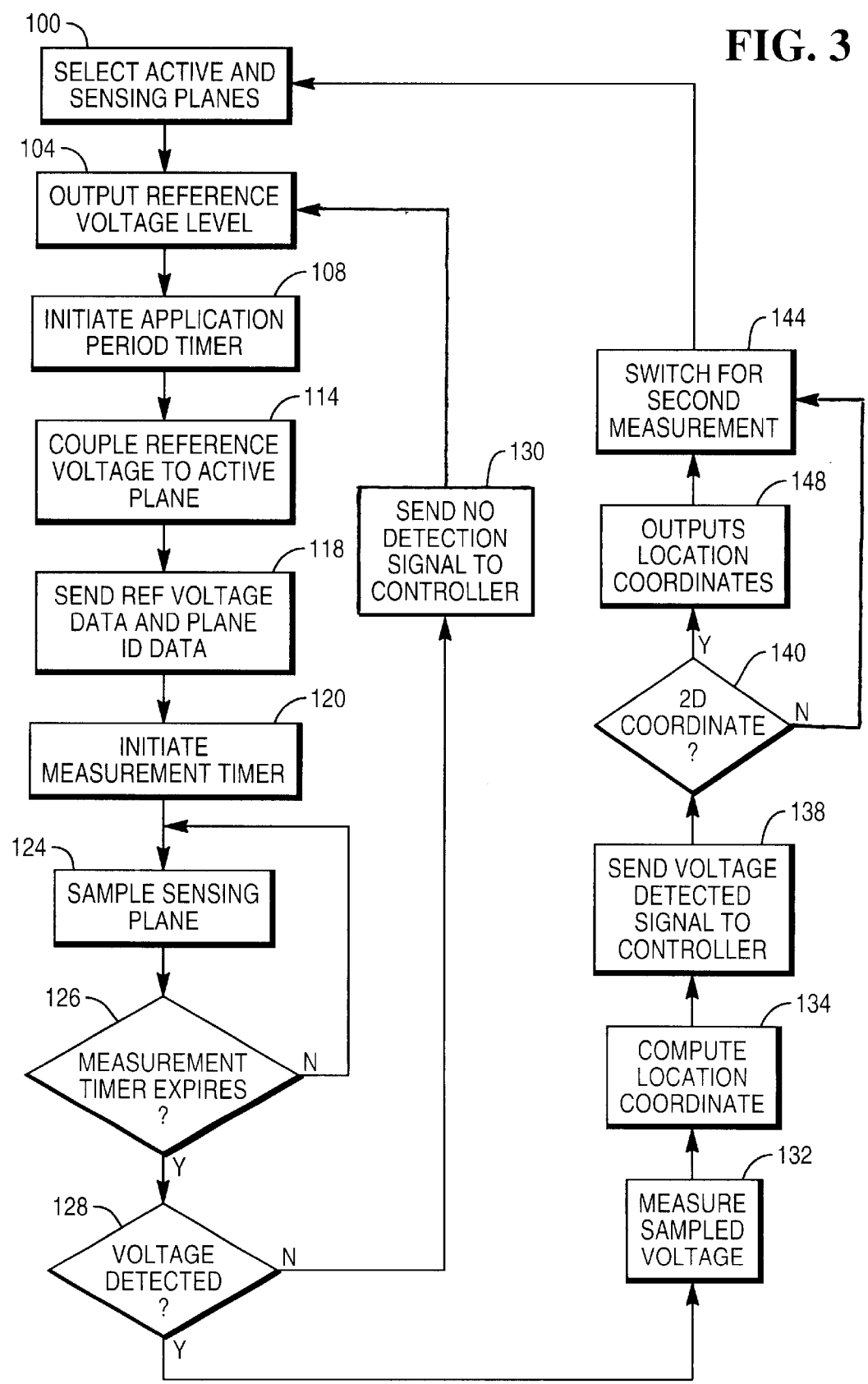
FIG. 3 is a flowchart of a method for controlling application of the randomly varying reference voltage to a plane of the touch screen of FIG. 1.

An exemplary process of the present invention is shown in FIG. 3. The process selects an active and a sensing plane of a touch screen (Block 100). Controller 18 provides a reference voltage level to source 24 (Block 104) and begins timing a period of time that corresponds to the application time period (Block 108). If a signal indicating whether a voltage was detected is not received from measurement device 20 before the application timer expires, controller 18 de-couples source 24 from the active plane and generates another reference voltage level (Block 104). In response to reference voltage level data, source 24 generates a voltage corresponding to the reference voltage level and controller 18 couples source 24 to the active plane (Block 114). Controller 18 also provides the reference voltage level data and active plane identification data to voltage measurement device 20 (Block 118). Measurement device 20 initiates a measurement timer that corresponds to the application time period (Block 120) and begins sampling the voltage on the sensing plane (Block 124). In response to the application timer expiring (Block 126), measurement device 20 determines whether a voltage was detected (Block 128). If one was not, a no detection signal is sent to controller 18 (Block 130) so it may generate another reference voltage level (Block 104). Otherwise, measurement device 20 measures the voltage present on the sensing plane (Block 132) and computes the location of the touch along the axis of the active plane (Block 134). Measurement device 20 sends a signal to controller 18 that indicates a voltage was sensed on the sensing plane (Block 138). Measurement device 20 determines whether this is the first or second location coordinate computed for a touch (Block 140). If it is the first one, device 20 switches to detect voltages (Block 144) and the process continues (Block 100). The switching performed may either de-couple the active plane from the voltage source and couple the plane being monitored to the voltage source or the direction of the voltage potential across the active plane may be changed. If the location coordinate being detected is the second one, the location coordinate pair is output (Block 148), the voltage source is coupled for determining the first location coordinate (Block 144) and the process waits for the next touch.

In response to the application period timer expiring in controller 18 without receipt of a signal indicating a voltage being sensed on the sensing plane, controller 18 determines another reference voltage level and resets the application period timer (Blocks 104, 108) and the process continues as previously described. If a signal is received from measurement device 20 that a voltage was sensed on the sensing plane, controller 18 switches the coupling of the voltage source for sensing the other location coordinate (Block 100) and generates a reference voltage level (Block 104). The process then continues as described until measurement device 20 determines the location of the touch along the second axis. The location coordinates are passed to an application program (148). The process then begins anew.

While the present invention has been illustrated by the description of exemplary embodiments and processes, and while the various embodiments and processes have been described in considerable detail, it is not the intention of the applicant to restrict or in any limit the scope of the appended claims to such detail. Additional advantages and modifications will readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method for preventing detection of a location coordinate generated by a touch screen comprising:

applying a varying reference voltage to a first plane of a touch screen with a time of application duration being substantially less than a touch period; and measuring a voltage present on a second plane during a portion of the application duration of the voltage to the first plane.

2. The method of claim 1 further comprising:

de-coupling a voltage source from said first plane upon expiration of a timer timing a period corresponding to said application duration time so that application of said reference voltage to said first plane is terminated.

3. The method of claim 2 wherein said reference voltage level is randomly selected before applying a next reference voltage to said first plane.

4. The method of claim 1 further comprising:

applying a varying reference voltage to said first plane of said touch screen in an orthogonal direction with a time of application duration being substantially less than a touch period; and measuring a voltage present on said second plane during a portion of the application duration of the voltage to the first plane.

5. The method of claim 1 further comprising:

applying a varying reference voltage to said second plane of said touch screen with a time of application duration being substantially less than a touch period; and measuring a voltage present on said first plane during a portion of the application duration of the voltage to the second plane.

6. A system for preventing detection of location coordinates corresponding to a touch location on a touch screen comprising:

means for applying a varying reference voltage to a first plane of a touch screen with a time of application duration being substantially less than a touch period; and means for measuring a voltage present on a second plane during a portion of the application duration of the voltage to the first plane.

7. The system of claim 6 further comprising:

means for de-coupling a voltage source from said first plane upon expiration of a timer timing a period corresponding to said application duration time so that application of said reference voltage to said first plane is terminated.

8. The system of claim 6 further comprising:

means for randomly selecting a reference voltage level before applying a next reference voltage to said first plane.

9. A system for preventing detection of location coordinates of a touch applied to a touch screen comprising:

a controller for generating a reference voltage level and for applying the generated voltage level to a first plane of a touch screen for a time that is substantially less than a touch period; and a voltage measurement device for measuring a voltage on a second plane of the touch screen during the time the generated voltage level is applied to the first plane.

10. The system of claim 9 wherein said controller randomly generates said reference voltage level.

11. The system of claim 9 wherein the controller couples and de-couples a voltage source to the first plane to apply the generated voltage level for a time that is substantially less than a touch period.

12. The system of claim 11 wherein said controller changes a direction of a voltage potential being applied to said first plane from said voltage source in response to a voltage being measured on said second plane.

13. The system of claim 11 wherein said controller de-couples said voltage source from said first plane and couples said voltage source to said second plane so that a second location coordinate may be determined.

* * * * *